United States Patent [19]

Frydendal

[11] 4,300,969
[45] Nov. 17, 1981

[54] CARDBOARD LAMINATE FOR FOODSTUFFS AND METHOD FOR PRODUCTION THEREOF

[75] Inventor: Tom Frydendal, Oslo, Norway

[73] Assignee: Ex-Cell-O Corporation, Troy, Mich.

[21] Appl. No.: 117,741

[22] Filed: Feb. 1, 1980

Related U.S. Application Data

[60] Continuation of Ser. No. 948,009, Sep. 29, 1978, abandoned, which is a division of Ser. No. 767,782, Feb. 11, 1977, abandoned.

[30] Foreign Application Priority Data

Feb. 13, 1976 [NO] Norway ................................ 760476

[51] Int. Cl.³ .................. B29C 19/00; B32B 27/10; B65D 85/00
[52] U.S. Cl. ................... 156/244.11; 156/244.23; 156/244.24; 426/127; 428/212; 428/219; 428/513; 428/514; 428/518
[58] Field of Search .............. 428/513, 514, 518, 461, 428/464, 219, 212; 156/244.23, 244.24, 244.11; 426/127

[56] References Cited

U.S. PATENT DOCUMENTS

| | | | |
|---|---|---|---|
| 3,162,543 | 12/1964 | Wilkins | 428/513 X |
| 3,560,227 | 2/1971 | Eichhorn et al. | 426/127 |
| 3,976,528 | 8/1976 | James | 156/244.23 |
| 4,048,428 | 9/1977 | Baird, Jr. et al. | 428/518 X |

*Primary Examiner*—Thomas J. Herbert, Jr.
*Attorney, Agent, or Firm*—John P. Moran; John C. Evans

[57] ABSTRACT

A laminate for use in cartons for sterilized milk, fruit juices etc. consists of a cardboard web, a layer of heat-sealable thermoplastic material, preferably polyethylene, on the side of the laminate which is to form the outer sides of the cartons, and three layers of plastic material on the other side. Of these three layers, the middle layer consists of polyvinylidene chloride and the two others both consist of a plastic material of the same type as on the outer side. The innermost of these layers may be colored.

3 Claims, 1 Drawing Figure

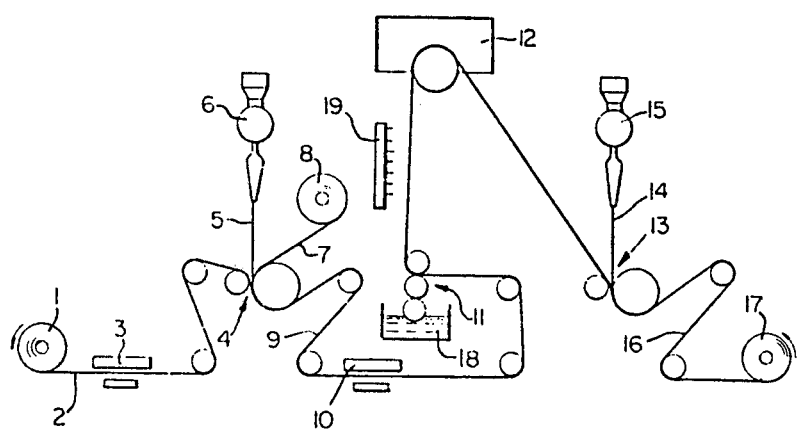

CARDBOARD LAMINATE FOR FOODSTUFFS AND METHOD FOR PRODUCTION THEREOF

This is a continuation of divisional application Ser. No. 948,009, filed Sept. 29, 1978, now abandoned of patent application Ser. No. 767,782, filed Feb. 11, 1977 and now abandoned.

FIELD OF THE INVENTION

The present invention relates to a substantially light-proof and oxygen-proof cardboard laminate for use in cartons for foodstuffs such as sterilized milk, fruit juice etc., said laminate comprising a cardboard layer, and oxygen-proof layer and an outer and an inner layer of a physiologically unobjectionable, heat-sealable thermoplastic material. The invention also relates to a method for the production of such a cardboard laminate.

BACKGROUND OF THE INVENTION

It is known to provide an aluminum foil between to polyethylene layers on one side of a cardboard layer in order to make the resulting laminate light-proof and oxygen-proof. Such an aluminum foil is very expensive and is only justified when the requirements with respect to imperviousness to light and oxygen are very strict. It is also known to manufacture a packing material for milk from colored polyethylene, which provides a relatively good imperviousness to light, but does not guarantee imperviousness to oxygen.

SUMMARY OF THE INVENTION

The object of the present invention is to provide a cardboard laminate for use in cartons for foodstuffs such as sterilized milk, fruit juices etc., the laminate having a high degree of imperviousness to light and oxygen, but being substantially cheaper that an aluminum coated cardboard, the production of said laminate not requiring new plants or machinery.

The laminate of the invention is characterized in that the oxygen-proof layer consists of polyvinylidene chloride interposed between two layers of thermoplastic material. Thus, starting from the outer side of the laminate, the laminate consists of a thermoplastic layer, a cardboard, a thermoplastic layer, a polyvinylidene chloride layer and finally of a layer of thermoplastic material on the inner side of the laminate.

The polyvinylidene chloride layer should have a thickness of at least 2 and preferably about 6 gram per square meter. The imperviousness to light may be obtained by using a colored cardboard, but preferably the layer of thermoplastic material between the polyvinylidene chloride layer and the cardboard is colored and serves as a light-proof layer.

Thus, such a cardboard laminate may, starting from the outer side of the laminate, comprise a polyethylene layer of at least 10 and preferably about 14 gram per square meter, a cardboard of 235 to 450 and preferably about 340 gram per square meter, a colored polyethylene layer of at least 10 and preferably about 25 gram per square meter, a polyvinylidene chloride layer of at least 2 and preferably about 6 gram per square meter and a polyethylene layer on the inside of the laminate of at least 10 and preferably about 35 gram per square meter.

Such a laminate does not have the same imperviousness as a laminate of cardboard and an aluminum foil, and such aluminum coated cardboard will therefore still be required for some purposes. A substantial advantage of the laminate according to the invention is that it may be produced on the same plants as cardboards having a layer of aluminum, new or specific plants for the production of the laminate being, accordingly, not required.

The method of the invention is characterized by using a known plant including an extruder for applying an extruded film of thermoplastic material on a cardboard web, means for supplying an aluminum foil over the film of plastic material, a station for applying a primer onto the aluminum foil and a further extruder for applying a further extruded film on the top of the primer, operatively disconnecting the means for supplying the aluminum foil, and supplying a solution or an emulsion of polyvinylidene chloride instead of the primer in the station for applying a primer.

In order to obtain imperviousness to light, a film of colored polyethylene is preferably applied by means of the first extruder. However, when a sufficient imperviousness to light is obtained by means of a colored cardboard, the first extruder may be operatively disconnected.

In order to reduce the risk of delamination of the final product, certain pretreatments of the various layers prior to the application of the next layer may be contemplated to enhance the adhesion between the polyvinylidene chloride layer and the two adjacent polyethylene layers. However, another possibility is to include an adhesion enhancing additive in the solution or emulsion of polyvinylidene chloride. Of course, it must be possible to mix this additive in dissolved or emulsified form with the solution or emulsion of polyvinylidene chloride. As such adhesion enhancing additives materials similar to those used in primers are contemplated, including polycondensed aldehydes. Thus, the melamine-formaldehyde sold under the trade name Uformite MM-55 and supplied by Röhm and Haas may be used in an amount of 1 to 5 percent in solutions containing organic solvents.

The polyvinylidene chloride layer is applied as a relatively thin (for instance an approximately 25 percent) solution or emulsion having a viscosity of at most 100 cP and preferably about 30 cP and leaving a polyvinylidene chloride coating of 2 to 10 gram per square meter upon evaporation of the solvent or the emulsion vehicle.

As a solvent methyl-ethyl ketone may be used, but also other solvents or emulsion vehicles may be used including water, which has especial advantages with respect to the working environment for those operating the plant.

BRIEF DESCRIPTION OF THE DRAWING

The invention will now be explained in more detail, reference being had to the drawing, which strongly diagrammatically illustrates a known plant for the production of cardboard coated with an aluminum foil layer.

In the FIGURE there is shown a supply roll 1 of a suitable cardboard 2 having a base weight of for instance 210 (340 gram per square meter). The cardboard 2 is passed through a pretreatment station 3 in which it is subjected to a corona treatment. Thereupon the cardboard 2 is passed over guide rollers to a station 4 in which it is combined with a film 5 of a suitable thermoplastic material extruded from an extruder 6. The plastic material may for instance be polyethylene, polypropylene, polyamide or an ionomer. In the station 4 an aluminum foil 7 from a roll 8 may also be supplied. The resulting laminate 9 is then passed through a further pretreatment station 10 into a station 11 for applying a primer and then through a tunnel drier 12. A further extruded film 14 of thermoplastic material is then supplied from an extruder 15 in a station 13. In the drawing it is indicated that the resulting laminate 16 is wound into a roll 17. However, a film of heat-sealable thermoplastic material is to be applied also to the opposite side of the cardboard web, and it will be understood that this application may be effected in a further station before the finished laminate is wound to a roll or advanced to punching, scoring, folding etc. for the production of cartons. It is required from the plastic material in the outermost layers on either side of the cardboard laminate to be physiologically unobjectionable, the material at the same time being heat-sealable in order to permit the production of completely sealed cartons by heat-sealing of the plastic layers to each other.

DETAILED DESCRIPTION OF THE PREFERRED EMBODIMENT

In the production of a cardboard laminate according to the invention on the plant illustrated in the drawing, the supply of aluminum foil 7 is interrupted. Further, a layer of polyvinylidene chloride is supplied instead of a primer in the station 11. The polyvinylidene chloride is applied in the form of a relatively thin solution or emulsion. The polyvinylidene chloride may for instance be dissolved in methyl-ethyl ketone. A 25 percent solution of polyvinylidene chloride in methylethyl ketone has a viscosity of approximately 32 cP, and even small reductions of the consentration will result in a heavy further reduction of the viscosity. The rolls used to pick up the solution or emulsion from a bath 18 and apply the solution to the laminate, are preferably screen pattern rollers of the type used in rotogravure. However, also other methods of application are feasible. Thus, a doctor knife or smooth rollers may be used to apply the solution. Other solvents or emulsion vehicles may be used: The solvent or the emulsion vehicle must be removed from the layer of polyvinylidene chloride before the next film 14 of thermoplastic material is applied. This removal takes place in a drying station comprising a tunnel drier 12. The tunnel drier 12 is, of course, only very schematically illustrated in the drawing and will actually be substantially longer than shown, the laminate being also guided in a winding path through the drier in order to increase the residence time therein.

Further, a radiation drying means 19 is illustrated in the drawing ahead of the tunnel drier 12. Since evaporation of large amounts of methyl-ethyl ketone may cause problems with respect to the working evironment for those operating the plant, emulsions of polyvinylidene chloride in water will be especially interesting from an environment viewpoint. Further, in the production of a cardboard laminate according to the invention, the extruder 6 may extrude a colored plastic material, so that the plastic film 5 forms a substantially light-proof layer. Of those colors providing a relatively good imperviousness to light, grey colors are of special interest. However, it may also be considered to disconnect the extruder 6 if, instead, a cardboard type is used which provides the necessary imperviousness to light.

What I claim is:

1. A method of preparing a substantially oxygen-proof cardboard laminate adapted for cartons for foodstuffs, said method comprising the following steps:
   a. forming a suitably shaped cardboard layer of from 235 to 450 g/m$^2$;
   b. extruding a layer of polyethylene of at least 10 g/m$^2$ on each side of said cardboard layer;
   c. supplying as an emulsion a layer of polyvinylidene chloride of at least 2 g/m$^2$ over one of the layers of polyethylene;
   d. drying the layer of polyvinylidene chloride; and
   e. extruding a further layer of polyethylene of at least 10 g/m$^2$ on the layer of polyvinylidene chloride.

2. The method described in claim 1, wherein the layer of polyvinylidene chloride contains an adhesion enhancing additive consisting of a polycondensated aldehyde.

3. A method of preparing a substantially oxygen-proof cardboard laminate adapted for cartons for foodstuffs, said method comprising the following steps:
   a. forming a suitably shaped cardboard layer having a weight characteristic on the order of 340 g/m$^2$;
   b. extruding a layer of polyethylene on the order of 14 g/m$^2$ on one side of said cardboard layer;
   c. extruding a layer of colored polyethylene on the order of 25 g/m$^2$ on the other side of said cardboard layer;
   d. supplying as an emulsion a layer of polyvinylidene chloride on the order of 6 g/m$^2$ on the layer of colored polyethylene;
   e. drying the layer of polyvinylidene chloride; and
   f. extruding a further layer of polyethylene on the order of 35 g/m$^2$ on the layer of polyvinylidene chloride.

* * * * *